United States Patent
Lokam et al.

(10) Patent No.: US 9,684,710 B2
(45) Date of Patent: *Jun. 20, 2017

(54) EXTENDING RANDOM NUMBER SUMMATION AS AN ORDER-PRESERVING ENCRYPTION SCHEME

(75) Inventors: Satyanarayana V. Lokam, Bangalore (IN); Ajay Manchepalli, Bangalore (IN); Balasubramanyan Ashok, Redmond, WA (US); Debapratim De, Redmond, WA (US); Sandeep P. Karanth, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 913 days.

This patent is subject to a terminal disclaimer.

(21) Appl. No.: 12/474,222

(22) Filed: May 28, 2009

(65) Prior Publication Data

US 2010/0306221 A1    Dec. 2, 2010

(51) Int. Cl.
*G06F 7/00* (2006.01)
*G06F 17/30* (2006.01)
(Continued)

(52) U.S. Cl.
CPC .... *G06F 17/30631* (2013.01); *G06F 21/6227* (2013.01); *G06F 21/6245* (2013.01); *H04L 9/088* (2013.01)

(58) Field of Classification Search
CPC .................................................. G06F 17/3021
See application file for complete search history.

(56) References Cited

U.S. PATENT DOCUMENTS 5,412,730 A    5/1995   Jones
6,067,543 A *  5/2000   Burrows
(Continued)

FOREIGN PATENT DOCUMENTS

WO    WO-0239411    5/2002

OTHER PUBLICATIONS

Ye Tian: A Fast Search Method for Encrypted Medical Data:2009; Communuications Workshop; pp. 1-5.*
(Continued)

*Primary Examiner* — Mariela Reyes
*Assistant Examiner* — Jermaine Mincey
(74) *Attorney, Agent, or Firm* — Perkins Coie LLP

(57) ABSTRACT

A method and system for cryptographically indexing, searching for, and retrieving documents is provided. In some embodiments, an encryption system is provided that generates a document index that allows users to retrieve documents by performing encrypted queries for keywords associated with the documents. In some embodiments, each keyword maps to the same number of encrypted document identifiers. In some embodiments, an extractor graph is employed to map an indication of each keyword to a number of buckets storing encrypted document identifiers. In some embodiments, an order-preserving encryption system is provided. The encryption system uses an ordered index that maps encrypted instances of ordered attribute values to documents that are associated with those values. The ordered index enables queries containing query operators that rely on order, such as less than ("<") or greater than (">"), to be successfully performed on encrypted attribute values.

27 Claims, 12 Drawing Sheets

(51) Int. Cl.
*G06F 21/62* (2013.01)
*H04L 9/08* (2006.01)

(56) References Cited

U.S. PATENT DOCUMENTS

| | | | |
|---|---|---|---|
| 6,076,086 A * | 6/2000 | Masuichi et al. | |
| 6,088,456 A | 7/2000 | McCracken et al. | |
| 6,246,768 B1 | 6/2001 | Kim | |
| 6,925,181 B2 * | 8/2005 | Kohn et al. | 380/213 |
| 6,950,518 B2 | 9/2005 | Henson et al. | |
| 7,155,011 B2 | 12/2006 | Ueda et al. | |
| 7,248,691 B1 * | 7/2007 | Pandit et al. | 380/28 |
| 7,269,258 B2 | 9/2007 | Ishihara et al. | |
| 7,426,752 B2 | 9/2008 | Agrawal et al. | |
| 7,827,416 B2 * | 11/2010 | Hanazaki | G06F 21/10 380/277 |
| 8,819,451 B2 | 8/2014 | Lokam et al. | |
| 2002/0059281 A1 * | 5/2002 | Watanabe et al. | 707/100 |
| 2002/0120838 A1 | 8/2002 | Abdulkader | |
| 2003/0002665 A1 | 1/2003 | Sako et al. | |
| 2004/0096058 A1 | 5/2004 | Cho et al. | |
| 2004/0141614 A1 | 7/2004 | Choi et al. | |
| 2005/0004924 A1 * | 1/2005 | Baldwin | 707/100 |
| 2005/0223414 A1 * | 10/2005 | Kenrich et al. | 726/27 |
| 2006/0013199 A1 * | 1/2006 | Boora et al. | 370/352 |
| 2006/0015945 A1 * | 1/2006 | Fields | 726/27 |
| 2006/0034453 A1 | 2/2006 | Liu | |
| 2006/0101285 A1 * | 5/2006 | Chen et al. | 713/193 |
| 2006/0129545 A1 | 6/2006 | Golle et al. | |
| 2006/0155739 A1 | 7/2006 | Broder et al. | |
| 2007/0038674 A1 * | 2/2007 | Bejar | 707/104.1 |
| 2007/0109124 A1 * | 5/2007 | Park et al. | 340/572.1 |
| 2007/0255698 A1 | 11/2007 | Kaminaga et al. | |
| 2007/0265829 A1 * | 11/2007 | Turner et al. | 704/9 |
| 2007/0294235 A1 * | 12/2007 | Millett | 707/3 |
| 2008/0050712 A1 | 2/2008 | Madani et al. | |
| 2008/0059414 A1 * | 3/2008 | Cristofor et al. | 707/2 |
| 2008/0065607 A1 | 3/2008 | Weber | |
| 2008/0133514 A1 * | 6/2008 | Relyea | 707/6 |
| 2008/0183656 A1 * | 7/2008 | Perng et al. | 707/2 |
| 2008/0192936 A1 | 8/2008 | Bellwood et al. | |
| 2009/0060179 A1 * | 3/2009 | Schneider | H04L 9/0662 380/46 |
| 2009/0063417 A1 * | 3/2009 | Kinder | 707/3 |
| 2009/0097661 A1 * | 4/2009 | Orsini et al. | 380/279 |
| 2009/0106205 A1 * | 4/2009 | Rowney et al. | 707/3 |
| 2009/0300351 A1 | 12/2009 | Lei et al. | |
| 2010/0285865 A1 * | 11/2010 | Enzminger | 463/22 |
| 2011/0004607 A1 | 1/2011 | Lokam et al. | |
| 2013/0007464 A1 * | 1/2013 | Madden | G06F 21/6218 713/179 |

OTHER PUBLICATIONS

Dawn Song; Practical Techniques for Searches on Encrypted Data; 2000; IEEE; pp. 1-12.*
Ashish Arora; Does information security attack frequency increase with vulnerability disclosure;2006; Springer; p. 350-362.*
U.S. Appl. No. 12/474,235, filed May 28, 2009, Lokam et al.
Agrawal, R. et al, "Order Preserving Encryption for Numeric Data," IBM Almaden Research Center, http://www.almaden.ibm.com/cs/projects/iis/hdb/Publications/papers/opes.pdf, 2004 (12 pages).
Walton, J., "Applied Crypto++: Pseudo Random Number Generators," The Code Project, http://www.codeproject.com/KB/cpp/PRNG.aspx, 2007 (9 pages).
Ozsoyoglu, G. et al, "Anti-Tamper Databases: Querying Encrypted Databases," Case Western Reserve University, http://vorlon.case.edu/~chung/Publication/SubmissionOzsoyoglu.pdf, (15 pages).
Ge, T. et al, "Fast, Secure Encryption for Indexing in a Column-Oriented DBMS," Brown University, http://www.cs.brown.edu/research/db/publications/GeZdonic_ICDE07.pdf, 2007 (10 pages).
Waters, B. et al, "Buildling an Encrypted and Searchable Audit Log," Palo Alto Research Center, http://www.isoc.org/isoc/conferences/ndss/04/proceedings/Papers/Waters.pdf, 2004 (10 pages).
Borisov, N. et al, "Restricted Queries over an Encrypted Index with Applications to Regulatory Compliance," University of Illinois at Urbana-Champaign, http://www.springerlink.com/content/d31m653677655746/fulltext.pdf, 2008 (19 pages).
Guruswami, Venkatesan et al., "Unbalanced Expanders and Randomness Extractors from Parvaresh-Vardy Codes," 22nd Annual IEEE Conference on Computational Complexity, 2007, pp. 96-108.
Williams, Peter et al., "Usable PIR," http://www.cs.stonybrook.edu/~petertw/papers/usable.pir.williams.2008.pdf [accessed Oct. 24, 2011], 2008, 11 pages.
Bernstein, Yaniv et al., "Accurate Discovery of Co-Derivative Document via Duplicate Text Detection," Information Systems 31, 2006, pp. 595-609.
Ohtaki, Yasuhiro, "Constructing a Searchable Encrypted Log using Encrypted Inverted Indexes," Proceedings of the 2005 International Conference on Cyberworlds, © 2005 IEEE Computer Society.

* cited by examiner

EXTENDING RANDOM NUMBER SUMMATION AS AN ORDER-PRESERVING ENCRYPTION SCHEME

CROSS-REFERENCE TO RELATED APPLICATION

This application is related to U.S. patent application Ser. No. 12/474,235, filed May 28, 2009, now U.S. Pat. No. 8,819,451, entitled "Techniques for Representing Keywords in an Encrypted Search Index to Prevent Histogram-Based Attacks," the disclosure of which is incorporated by reference herein in its entirety.

BACKGROUND

With the proliferation of the Internet, more and more organizations are relying on hosted services to provide certain information technology (IT) resources. For example, a company may contract for email services from an outside email service provider rather than maintaining the servers, agents, and infrastructure necessary to provide its own email services. Hosted services enable these organizations to take advantage of those having specific knowledge and experience with different resources. Furthermore, provision of these services by an outside service provider can lower costs because the service provider can take advantage of an ever-expanding client base to provide these services more efficiently.

Many organizations, such as companies and nonprofits, use hosted electronic document management systems to archive electronic documents. These electronic document management systems may provide, among other things, storage, indexing, searching, and processing services for a large collection of documents. For example, a hospital may generate and collect thousands of documents every day, such as patients' medical records, doctors' reports, payroll records, vendor purchase orders, and so on. It may become cumbersome for the hospital to manage this large set of documents since the hospital may not be equipped or staffed to do so efficiently. To efficiently handle these documents, the hospital may employ the services of an electronic document management system. In some cases, the electronic document management system may be located remotely from its users and hosted by an electronic document management service provider. Hosting the electronic document management system remotely provides each end user with centralized access to the system. Centralization can alleviate many of the problems associated with distributed systems, such as coherency and maintenance issues. Because some organizations, such as hospitals and banks, generate a number of documents containing confidential information, such as an individual's medical or financial records, it is important that electronic document management systems provide certain security guarantees, such as services that do not rely on the use of plaintext (or unencrypted) information associated with the documents. Some systems allow a user to download and decrypt the encrypted information and sift through the information locally. However, this can be inefficient as the user may be looking only for a specific subset of the documents. As an added level of protection, organizations may also desire that an electronic document management service provider have access only to encrypted versions of the documents. Some electronic document management systems maintain an encrypted document index, which provides centralized access to a plurality of users without allowing the electronic document management system to determine the contents of the documents directly. However, as discussed below, these encrypted indexes can present certain risks, such as vulnerability to frequency-based attacks.

Some electronic document management services provide an encrypted keyword index that maps an encrypted version of a keyword to the documents containing that keyword. Placing the index with the electronic document management service provides centralized access to the index and better performance of the indexing and searching services. The electronic document management service may also provide a central repository of encrypted versions of the documents. When a user performs a query for a keyword, the keyword is encrypted using a predetermined encryption algorithm (or cipher) and encryption key, and then the encrypted keyword is passed to the electronic document management service. The electronic document management system uses the encrypted keyword index located at the electronic document management system to identify documents containing the keyword and provides an encrypted indication of these documents, such as an encrypted document identifier, to the user for decryption. When a user selects a document identifier, an encrypted version of the relevant document may be retrieved from the electronic document management server for decryption at the user's computer. Because these systems use a 1:1 mapping between keywords and encrypted keywords, however, they are susceptible to frequency-based attacks, such as a histogram-based attack. If the frequency with which words appear in a set of documents is known or can be reasonably estimated, some information about the documents can be inferred by comparing the frequency of encrypted keywords in a set of documents to the known or estimated frequency of unencrypted keywords in the documents. As an example, if the word "research" is known or estimated to be the most common word in a set of documents, then the most common encrypted keyword in the documents is likely to be the encrypted version of the word "research." In the case of an electronic document management system, an electronic document management service provider, which has access to the encrypted index but may have access only to the encrypted documents, can analyze the index to determine the frequency of encrypted keywords associated with the documents. As another example, an attacker may, over time, be able to determine the frequency of encrypted keywords associated with a set of documents by monitoring communications (e.g., queries and results) between clients and a server.

In some cases, a document index may map documents to a value in a sequence, such as a range of dates corresponding to a Date Created or Last Modified attribute of each document. When these document indexes are encrypted, queries for exact matches may succeed but queries that rely on order, such as less than or equal to ("≤") or greater than or equal to ("≥"), may fail unless the encryption algorithm used to encrypt the index is order-preserving. In a paper titled "Anti-Tamper Database Research: Inference Control Techniques," G. Bebek proposes a solution to this problem where a sequence of encrypted values is generated using a random number generator (G. Bebek, Anti-Tamper Database Research: Inference Control Techniques. Technical Report EECS 443 Final Report, Case Western Reserve University, November 2002). For each plaintext value, an encrypted value is generated by adding the next random number to the previously generated encrypted value. Because this technique maps a single encrypted value to each plaintext value, however, one may be able to infer information about the plaintext sequence from the sequence of encrypted values based on the distance between encrypted values. Furthermore, the 1:1 mapping between the plaintext values and the encrypted values opens Bebek's technique up to the frequency-based attacks previously described.

SUMMARY

A method and system for cryptographically indexing, searching for, and retrieving documents of an organization that are stored by a document service provider is provided. In some embodiments, the encryption system may employ an extractor graph (i.e., a regular bipartite graph mapping each of N vertices in a first set to D vertices in a second set) to map keywords to buckets containing encrypted document identifiers. The extractor graph can be constructed such that each keyword maps to the same number of buckets and that each bucket contains approximately the same number of encrypted document identifiers. In this manner, each keyword maps to approximately the same number of encrypted document identifiers. In other embodiments, the encryption system generates an index that maps an encrypted instance of each keyword to the same number of encrypted versions of document identifiers corresponding to documents that contain that keyword. In this manner, when a user performs a search for a particular keyword, the encryption system returns the same number of documents.

In some embodiments, the system may generate a mapping of encrypted instances to a selected number ($f_{max}$) of encrypted document identifiers by selecting each keyword and, for each document containing that keyword, generating an encrypted version of the document's identifier by concatenating the keyword to the document identifier along with a count value corresponding to the number of times the keyword-document identifier pair has been encrypted. If less than $f_{max}$ documents contain a particular keyword, the encryption system selects one of the document identifiers associated with the keyword and encrypts the selected document identifier with the keyword and the next count value. The encryption system then stores the mapping of the keyword to the generated encrypted document identifiers in the index and provides the index to a document service provider. When the encryption system employs an extractor graph, the parameters of the extractor graph can be chosen such that each bucket contains approximately the same number of encrypted document identifiers. Because a search for any keyword returns approximately the same number of encrypted document identifiers, it would be more difficult for a third party to determine how many distinct documents contain a particular keyword and thus more difficult to infer information about the documents.

When a user of the organization wants to search for a document containing a certain keyword, the encryption system (e.g., a query component of the encryption system) generates the encrypted instance of that keyword and submits the encrypted instance as a query to the document service provider. The document service provider uses the index to identify and return to the user the encrypted document identifiers that map to that encrypted instance. When a user selects a decrypted identifier, the encryption system retrieves that encrypted document from the document service provider, decrypts the document at the user's computer, and presents the document to the user.

In some embodiments, an order-preserving encryption system is provided. The encryption system uses an ordered index that maps encrypted instances of ordered attribute values (e.g., date created, size), which enables queries containing query operators that rely on order, such as less than ("<") or greater than (">"), to be successfully performed on the encrypted attribute values. The encryption system may create the ordered index by first generating a table that, for each value in the sequence of ordered values, includes a set of ordered encrypted instances. For each value in the sequence, the table includes a number of encrypted instances. Each encrypted instance may be generated by adding a random value to the previously generated encrypted instance. In some embodiments, the random number generator may be re-seeded with an encrypted instance prior to generating the next encrypted instance. Once the table has been generated, the ordered index can be created by associating each document with at least one of the encrypted instances of each of the attribute values associated with the document and adding the association to the index so that the document can be identified and retrieved in response to a query containing the selected encrypted instance.

The ordered index allows users to retrieve documents using queries that rely on order. When a user submits a query, the encryption system determines a range of encrypted instances associated with the query and sends an indication of the range, such as a lower and an upper bound, to a query server for document retrieval. The query server uses the ordered index to identify documents associated with encrypted instances that meet the query criteria and then sends an indication of these documents, such as encrypted document identifiers and/or encrypted summaries, to the user. Documents that are of interest to the user may then be selected for retrieval and, in some cases, decryption.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

DETAILED DESCRIPTION

Figure 1:
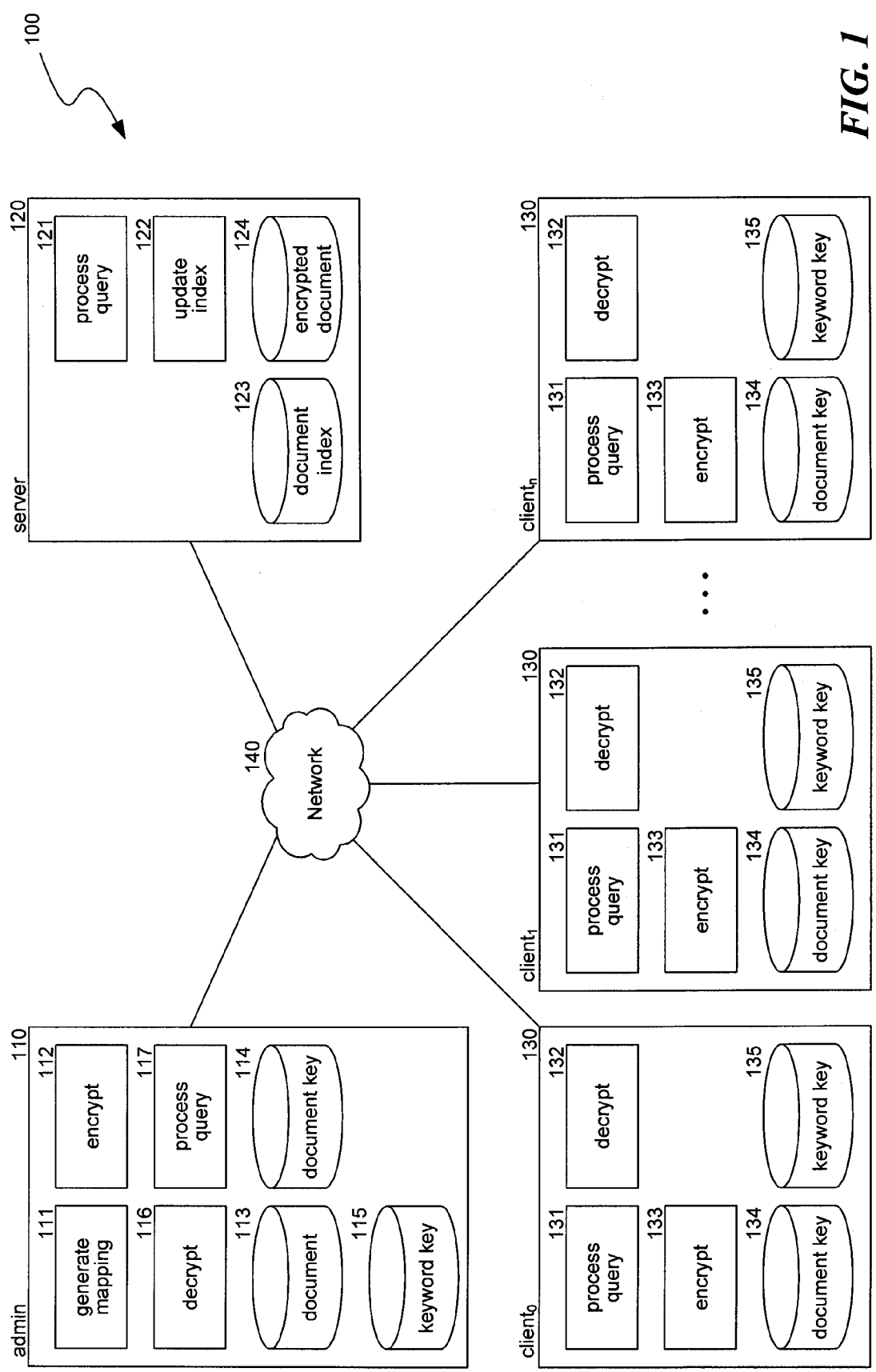
FIG. 1 is a block diagram illustrating various components of the encryption system in one embodiment.

A method and system for cryptographically indexing, searching for, and retrieving documents of an organization that are stored by a document service provider is provided. A document can be a general document of any kind (e.g., email, source code, financial statements, server logs, and medical records) or any form of stored data, such as an image file, a video file, a record in a database, a field in a table, etc. In some embodiments, the encryption system generates an index that maps an encrypted instance of each keyword to approximately the same number of encrypted document identifiers corresponding to documents that contain those keywords. In this manner, when a user performs a search for a particular keyword, the encryption system returns approximately the same number of documents. When the encryption system generates the index (e.g., an administrative component of the encryption system), the encryption system may identify the keyword contained by the largest number of documents and select this number as the number of encrypted document identifiers to which each encrypted instance will map. Alternatively, the encryption system may select another number, such as the total number of documents, 1,000,000, etc. In other embodiments, the encryption system may employ an extractor graph to map encrypted instances to a number of nonexclusive buckets containing approximately the same number of encrypted document identifiers. Using the extractor graph, the encrypted document identifiers are distributed to the buckets associated with a particular keyword. Because the buckets are nonexclusive, each bucket contains encrypted document identifiers associated with different keywords. When a search is performed for a particular keyword, the buckets associated with that keyword are identified and each of the encrypted document identifiers associated with those buckets is retrieved. Using keyword information embedded in the encrypted document identifier (as described below), the encryption system can identify which of the retrieved encrypted document identifiers are relevant to the search.

To generate the mapping of encrypted instances to the selected number ($f_{max}$) of encrypted document identifiers, the encryption system selects each keyword and, for each document containing that keyword, generates an encrypted version of the document's identifier by first concatenating the keyword to the document identifier along with a count value corresponding to the number of times the keyword-document identifier pair have been encrypted and then encrypting the concatenated string. For example, the first time keyword k1 and document identifier D1 are encrypted, they may be encrypted with a count value of 0 (i.e., encrypt(D1||k1||0) where encrypt(X) is a function that encrypts X and || corresponds to a concatenation operator). The second time k1 and D1 are encrypted, they may be encrypted as encrypt(D1||k1||1). The encryption system may apply a hash function, such as SHA-256 or SHA-512, to the keyword prior to generating the encrypted instances for the keyword so that the encrypted instances are generated from words of uniform length. If less than $f_{max}$ documents contain a particular keyword, the encryption system selects one of the document identifiers associated with the keyword and encrypts the selected document identifier with the keyword and the next count value. The encryption system then stores the mapping of the encrypted instance to the generated encrypted document identifiers in the index and provides the index to a document service provider. When the encryption system employs an extractor graph, the parameters of the extractor graph can be chosen such that each bucket contains approximately the same number of encrypted document identifiers. Because a search for any keyword returns approximately the same number of encrypted document identifiers, it would be more difficult for a third party to determine how many distinct documents contain a particular keyword, which would make inferring information about the documents less likely.

When a user of the organization wants to search for a document containing a certain keyword, the encryption system (e.g., a query component of the encryption system) submits an indication of the keyword as a query to the document service provider. In some embodiments, the document service provider uses the count value to identify and return to the user the encrypted document identifiers that map to that encrypted instance. Upon receiving the identifiers, the encryption system decrypts the identifiers and discards the encrypted document identifiers having a count value greater than 0. When the encryption system employs an extractor graph, each of the encrypted document identifiers associated with each of the buckets associated with an encrypted instance are returned in response to a query. When the results are retrieved, the encryption system can decrypt the encrypted document identifiers and discard those that do not contain the target keyword. The encryption system then displays the remaining decrypted identifiers to the user. When a user selects a decrypted identifier, the encryption system retrieves that encrypted document from the document service provider, decrypts the document, and presents it to the user.

As discussed below in more detail, the encryption system may use various techniques to encrypt a query to make it difficult for a third party to correlate encrypted instances to the same keyword. For example, the encryption system may submit each encrypted instance as a separate query to the document service provider routed through a single connection point so that the document service provider cannot determine which user submitted which query and which encrypted instances correspond to the same keyword. As another example, the encryption system may perform batch queries by submitting multiple keyword searches at the same time. The encryption system can associate results with the proper keyword by decrypting the encrypted document identifiers and identifying the keyword therein. Alternatively, the encryption system may randomly select keywords and submit their encrypted instances as part of a query. When the encryption system receives the resulting document identifiers, it can filter out those documents that were identified only because of the randomly selected keyword.

In some embodiments, an encryption system generates an ordered index that maps encrypted instances of document attribute values to the encrypted documents associated with those values. To generate the index, the encryption system generates a table of encrypted instances for each value in a sequence of values. For example, the encryption system may generate ten encrypted instances for each of a sequence of dates. The encryption system generates each encrypted instance by adding a random number to a previously generated encrypted instance, thereby providing a set of encrypted instances for each value in increasing order. Because the encrypted instances increase with the attribute values, the encryption system can successfully process queries that rely on order. To add a document to an index of encrypted creation dates maintained by the document service provider, the encryption system identifies the encrypted instances associated with the document's creation date and randomly selects one of the identified encrypted instances. For example, if two documents were created on Jul. 1, 2008, then the encryption system would identify all encrypted instances associated with Jul. 1, 2008 and randomly select one of the encrypted instances for one document and one of the encrypted instances for the other document. The encryption system then provides to the document service provider a mapping of the encrypted instances to the encrypted documents. The document service provider creates an index (e.g., using conventional techniques) that has an entry mapping the encrypted instances to the encrypted document. Because each attribute value is represented by multiple encrypted instances, it would be more difficult for a third party to determine what encrypted instances correspond to what attribute values and thus more difficult to infer information about the documents. In some embodiments, the system may establish a range of values between two encrypted instances to associate with a particular attribute value and randomly select a value from that range when adding a document to the index. For example, the first encrypted instance of Jan. 1, 1990 may be randomly selected from the interval between $RAND_0$ and $RAND_0+RAND_1$; the second encrypted instance may be randomly selected from the interval between $RAND_0+RAND_1$ and $RAND_0+RAND_1+RAND_2$, and so on, where $RAND_0$, $RAND_1$, and $RAND_2$ are randomly generated values. As another example, each encrypted instance of Jan. 1, 1990 may be randomly selected from the interval between $RAND_0$ and $RAND_0+RAND_1$ while each encrypted instance of Jan. 2, 1990 is randomly selected from the interval between $RAND_0+RAND_1$ and $RAND_0+RAND_1+RAND_2$, and so on.

When a user submits a query for documents based on a particular attribute value or range of values, the encryption system (e.g., a query component of the encryption system) determines a range of encrypted instances associated with the query and sends an indication of the range to the document service provider. For example, if a user submits a query for all documents created on Jul. 1, 2008, the encryption system would identify and send the smallest and largest encrypted instances of Jul. 1, 2008. The document service provider uses the index to identify those documents that map to encrypted instances within the range and provides the document identifiers to the encryption system. Upon receiving the identifiers, the encryption system decrypts the identifiers and displays the decrypted identifiers to the user. When a user selects a decrypted identifier, the encryption system retrieves that encrypted document from the document service provider, decrypts the document, and presents it to the user.

In some embodiments, an order-preserving encryption system is provided. The encryption system uses an ordered index to map encrypted instances of ordered attribute values (e.g., date created, size), which enables queries containing query operators that rely on order, such as less than ("<") or greater than (">"), to be successfully performed on the encrypted attribute values. For example, a query for all documents created after a certain date or that are larger than 1 MB can be retrieved even if the creation date and size of the document are encrypted in the ordered index. The encryption system creates the ordered index by first generating a table that, for each value in the sequence of ordered values, includes a set of ordered encrypted instances. For example, a document index that maps documents to the dates they were created may include a sequence of dates from Jan. 1, 1900 to Dec. 31, 2099. For each value in the sequence, the table includes a number of encrypted instances. Each value in the sequence may have the same number of encrypted instances. Alternatively, the number of encrypted instances for each value may vary. In some embodiments, the encryption system generates encrypted instances sequentially, starting with the lowest value in the sequence. The encryption system may generate each encrypted instance by adding a random value to a previously generated encrypted instance. For example, the first encrypted instance of Jan. 1, 1900 would be equal to randomly generated value $RAND_0$ because it is the first encrypted instance; the second encrypted instance of Jan. 1, 1900 would be equal to $RAND_0+RAND_1$, where $RAND_1$ is a randomly generated value, and so on. This summation of random values is carried out for each encrypted instance of a value and throughout each value in the sequence. For example, the first encrypted instance for Jan. 2, 1900 would be equal to the sum of the last encrypted instance of Jan. 1, 1900 and another randomly generated number. Once the table has been generated, the ordered index can be created by associating each document with at least one of the encrypted instances of each of the attribute values associated with the document. In some embodiments, each encrypted instance may be randomly selected from the interval between the current value of the sum and the current value of the sum plus the next randomly generated value. For example, the first encrypted instance of Jan. 1, 1990 may be randomly selected from the interval between $RAND_0$ and $RAND_0+RAND_1$; the second encrypted instance may be randomly selected from the interval between $RAND_0+RAND_1$ and $RAND_0+RAND_1+RAND_2$, and so on. As another example, each encrypted instance of Jan. 1, 1990 may be randomly selected from the interval between $RAND_0$ and $RAND_0+RAND_1$ while each encrypted instance of Jan. 2, 1990 is randomly selected from the interval between $RAND_0+RAND_1$ and $RAND_0+RAND_1+RAND_2$, and so on.

In some embodiments, the ordered index maps encrypted instances to indications of documents, such as document identifiers. To index a document, an attribute value associated with the document, such as its size or creation date, is retrieved. The encryption system then randomly selects an encrypted instance associated with the retrieved attribute value from the previously generated table and sends a mapping of the selected encrypted instance to an indication of the document to the document service provider, which adds it to the index so that the document can be identified and retrieved in response to a query containing the selected encrypted instance.

The ordered index allows users to retrieve documents using queries that rely on order. For example, a doctor may wish to retrieve all documents that were created on or after a certain date. To do so, the doctor simply enters the date into a search field and configures the search for a "greater than or equal to" search. When the query is submitted, the encryption system determines a range of encrypted instances associated with the query. For example, if the query was for all documents created on or after Nov. 1, 2007, then the range of encrypted instances would include all encrypted instances greater than or equal to the first encrypted instance associated with Nov. 1, 2007. In this example, the upper bound on the range is undefined. As another example, if the query were for all documents created before Nov. 1, 2007, then the range of encrypted instances would include all encrypted instances less than the last encrypted instance associated with Nov. 1, 2007. In this example, the lower bound on the range is undefined. The encryption system then passes an indication of the range, such as a lower and upper bound, to a query server of the document service provider for document retrieval. The query server uses the ordered index to identify documents associated with the encrypted instances that meet the search criteria and then sends an indication of these documents, such as encrypted or unencrypted document identifiers and/or summaries, to the user. The user may then select documents that are of interest to the user for retrieval and, in some case, decryption.

FIG. 1 is a block diagram illustrating various components of the encryption system in one embodiment. Encryption system 100 includes admin computer 110, server computer 120, and a plurality of client computers 130. Each of these computers may be interconnected via network 140. Admin computer 110 is an administrative computer of an entity for which a document index is created, such as a hospital, and includes several components used in the process of encrypting documents and generating a document index.

In this embodiment, admin computer 110 includes an admin subsystem of the encryption system 100, that includes generate mapping component 111, encrypt component 112, document store 113, document key store 114, keyword key store 115, decrypt component 116, and process query component 117. Generate mapping component 111 generates a document mapping for a set of documents. Encrypt component 112 encrypts data (e.g., a keyword, document, document identifier) according to an encryption algorithm. Decrypt component 116 decrypts data. Document store 113 stores documents for which a document mapping may be generated, document key store 114 stores keys used to encrypt the documents, and keyword key store 115 stores the keys used to generate the encrypted instances of keywords. Process query component 117 processes document queries received from a user.

In this embodiment, client computers 130 may be accessed by users wishing to perform a query, such as a hospital employee looking for a patient's medical records, and include process query component 131, decrypt component 132, encrypt component 133, document key store 134, and keyword key store 135. Process query component 131. Decrypt component 132 decrypts encrypted data, such as encrypted documents and encrypted document identifiers, that are retrieved as a result of a query. Encrypt component 133 generates encrypted data, such as the encrypted instances of keywords. Document key store 134 stores keys used for encrypting documents, and keyword key store 135 stores the keys used to generate the encrypted instances of each keyword.

In this embodiment, server computer 120 uses the index to identify documents matching user queries and also provides copies of encrypted documents. Server computer 120 includes process query component 121, update index component 122, document index 123, and encrypted document store 124. Process query component 121 processes user queries received from client computers 130. Update index component 122 updates an index using conventional indexing techniques based on associations between encrypted instances and encrypted documents received from the encryption system. Document index 123 provides a mapping of encrypted instances of keywords to indications of documents, such as encrypted document identifiers. Encrypted document store 124 stores encrypted documents.

The computing devices on which the encryption system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the encryption system, which means a computer-readable medium that contains the instructions. In addition, the instructions, data structures, and message structures may be stored or transmitted via a data transmission medium, such as a signal on a communication link, and may be encrypted. Various communication links may be used, such as the Internet, a local area network, a wide area network, a point-to-point dial-up connection, a cell phone network, and so on.

Embodiments of the encryption system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The encryption system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
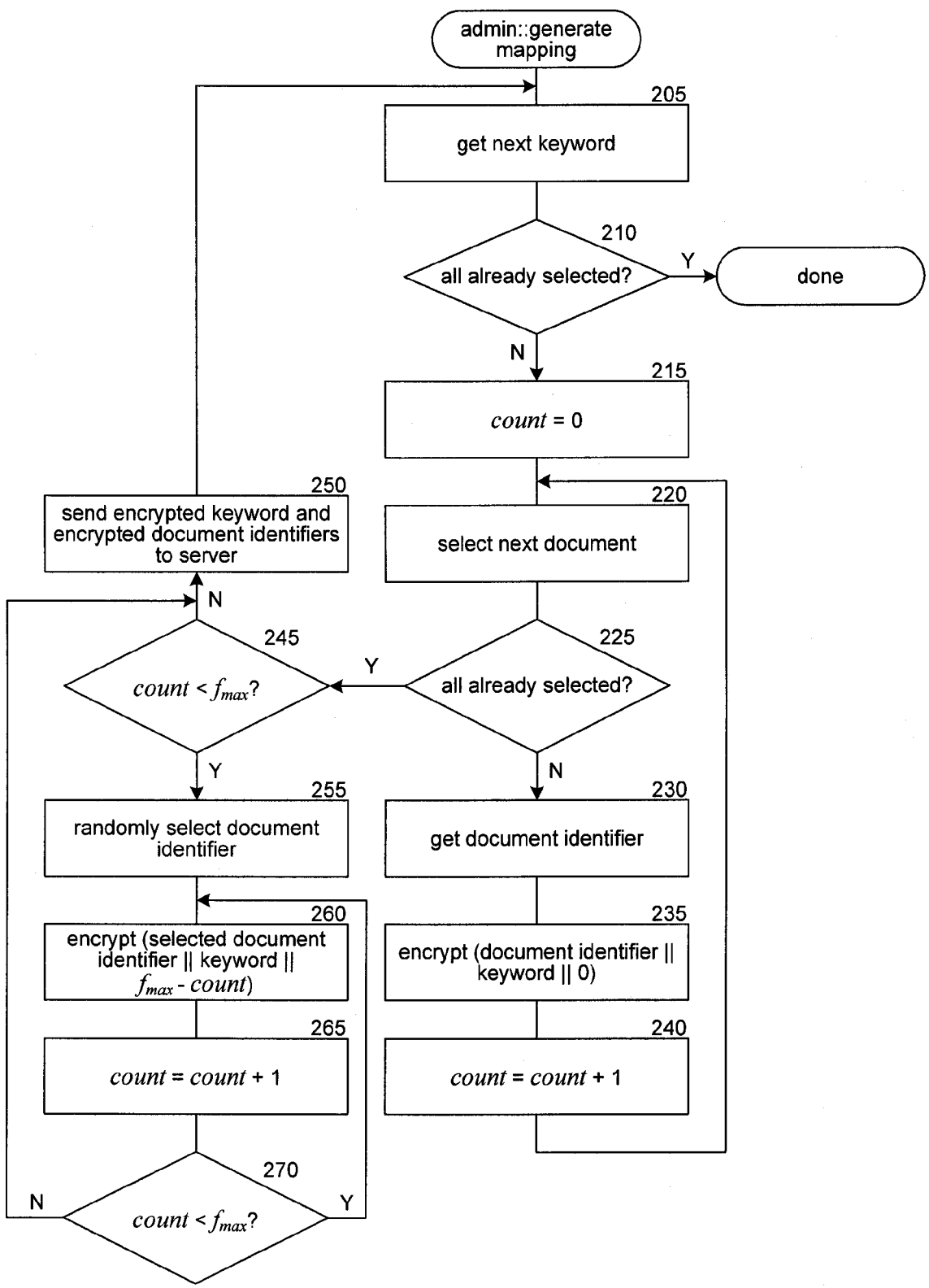
FIG. 2 is a flowchart illustrating the processing of a generate mapping component of an admin subsystem in some embodiments.

FIG. 2 is a flowchart illustrating the processing of a generate mapping component of an admin subsystem in some embodiments. The component maps an encrypted instance of each keyword to the same number, or a minimum number, of encrypted document identifiers. This number, $f_{max}$, may be determined based on which keyword has the largest number of associated documents. As another example, $f_{max}$ may be determined based on the total number of documents in the collection of documents. If the number of document identifiers encrypted for a particular keyword is less than $f_{max}$, the component randomly selects one of the document identifiers and encrypts that document identifier until $f_{max}$ encrypted document identifiers for the keyword have been generated. In block 205, the component selects the next keyword. In decision block 210, if all of the keywords have already been selected, then processing completes, else the component continues at block 215. In block 215, the component sets the value of count to 0. The component uses the variable count to count the number of encrypted document identifiers that have been generated for the selected keyword. In block 220, the component selects the next document associated with the selected keyword. In decision block 225, if all of the documents have already been selected, then the component continues processing at block 230, else the component continues processing at block 245. In block 230, the component gets the document identifier of the selected document. In block 235, the component generates an encrypted document identifier as encrypt(document identifier||0). In some embodiments, the component may apply a hash function, such as SHA-256 or SHA-512, to the concatenated string, or any of its components, prior to encryption. In block 240, the component increments count by 1 and loops back to block 220 to select the next document. In decision block 245, if count is less than $f_{max}$, then the component continues processing at block 255, else the component continues processing at block 250. In block 250, the component sends a mapping of an encrypted instance of the keyword to the generated encrypted document identifiers to the server to update the index and then continues to block 205 to select the next keyword. In block 255, the component randomly selects a document identifier. In block 260, the component generates an encrypted document identifier as encrypt(document identifier||$f_{max}$–count). In some embodiments, the component may apply a hash function, such as SHA-256 or SHA-512, to the concatenated string, or any of its components, prior to encryption. In block 265, the component increments count by 1. In decision block 270, if count is less than $f_{max}$ then the component loops to block 260 to generate another encrypted document identifier, else the component loops to block 250.

Figure 3:
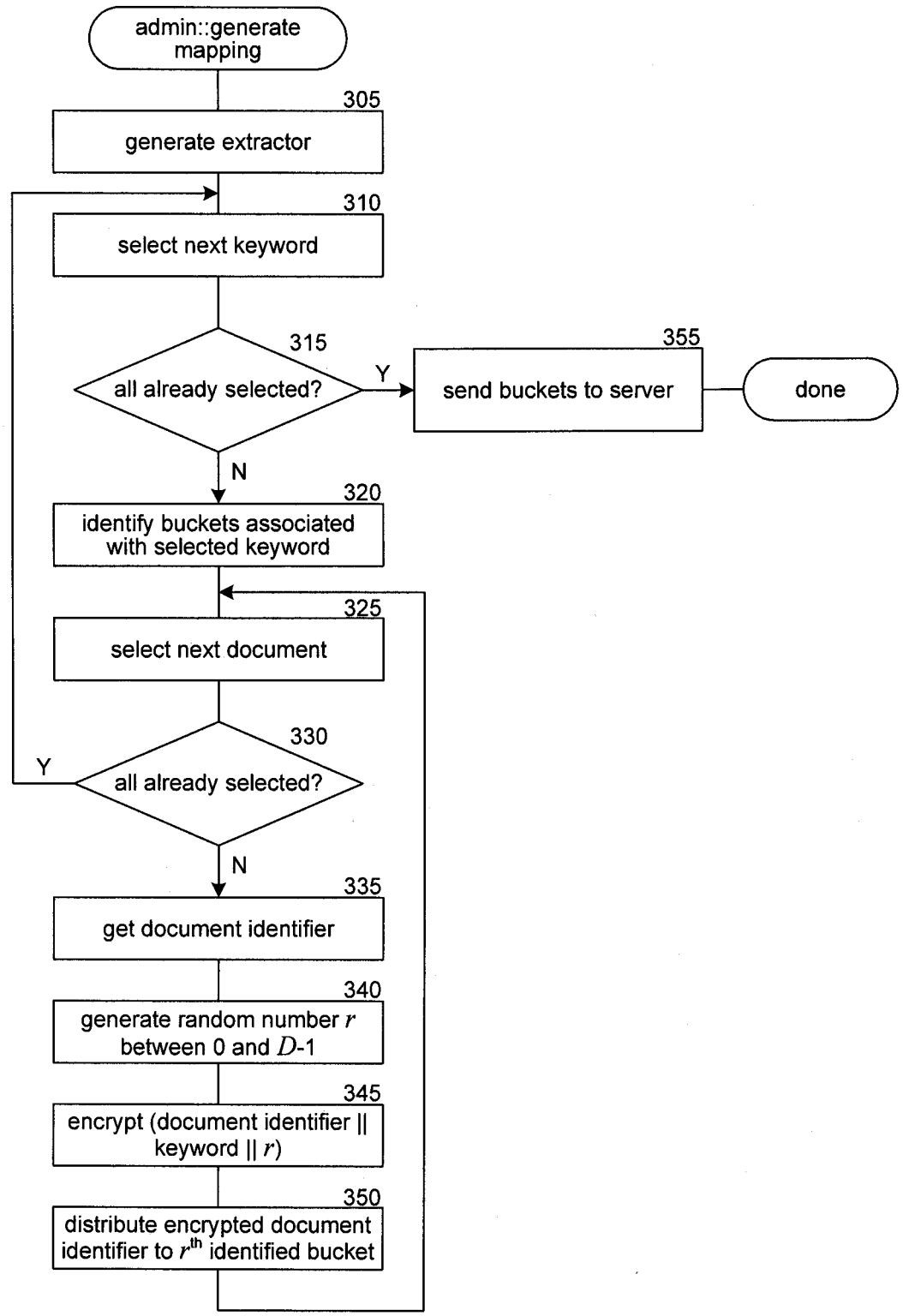
FIG. 3 is a flowchart illustrating the processing of a generate mapping component in another embodiment.

FIG. 3 is a flowchart illustrating the processing of a generate mapping component in another embodiment. In this example, the component generates a mapping using an extractor graph, which is a regular bipartite graph mapping each of N vertices in a first set (e.g., a set of keywords) to D vertices in a second set (e.g., buckets containing a set of encrypted document identifiers), the D vertices in the second set corresponding to "neighbors" of vertices in the first set and vice versa. In other words, each of the N vertices in the first set has D neighbors in the second set. One can use the extractor graph to identify the neighbors of a vertex selected from the first set. There are many techniques for generating extractor graphs, such as the technique described in Unbalanced Expanders and Randomness Extractors from Parvaresh-Vardy Codes by V. Guruswami, C. Umans, and S. Vadhan (Proceedings of the Twenty-Second Annual IEEE Conference on Computational Complexity, p. 96-108 (2007)), which is herein incorporated by reference.

In block 305, the component generates an extractor graph that maps an indication of each keyword, such as a hash value, to D empty "buckets" which will eventually contain encrypted document identifiers. In block 310, the component selects the next keyword. In block 315, if all of the keywords have already been selected, then the component continues processing at block 355, else the component continues processing at block 320. In block 320, the component uses the extractor graph to identify the buckets associated with the keyword (i.e., the keyword's D neighbors). In block 325, the component selects the next document associated with the keyword. In block 330, if all of the documents associated with the keyword have already been selected, the component loops back to block 310 to select the next keyword, else the component continues processing at block 335. In block 335, the component gets the document identifier of the selected document. In block 340, the component generates a random number r between 0 and D–1. In block 345, the component generates an encrypted document identifier as encrypt(document identifier selected keyword||r). In some embodiments, the component may apply a hash function, such as SHA-256 or SHA-512, to the concatenated string, or any of its components, prior to encryption. In block 350, the component distributes the encrypted document identifier to the $r^{th}$ identified bucket (i.e., the keyword's $r^{th}$ neighbor) and then loops back to block 325 to select the next document. In this manner, the distribution of document identifiers associated with a particular keyword across each of the D buckets associated with that keyword is close to uniform. Furthermore, each bucket includes encrypted versions of multiple document identifiers. In some examples, an extractor graph can be generated with parameters such that approximately the same number of encrypted document identifiers are distributed to each bucket. In block 355, the component sends an indication of the buckets to the server and completes.

When a user performs a search for a particular keyword, the encryption system, using the extractor graph, identifies the buckets associated with that keyword (i.e., the keyword's "neighbors"). Alternatively, the client may send an indication of the keyword to the server, which then uses the extractor graph to identify the appropriate buckets. The server then returns each of the encrypted document identifiers associated with the identified buckets. Using the keyword information included in the encrypted document identifier, the client can determine which of the returned document identifiers are relevant to the search. For example, encrypted document identifiers associated with keywords that were not part of the search can be identified and discarded. Furthermore, because keyword information is concatenated with document identifiers prior to encryption, the client may perform batch queries and quickly identify which document identifiers are associated with which keywords included in the batch query.

Figure 4:
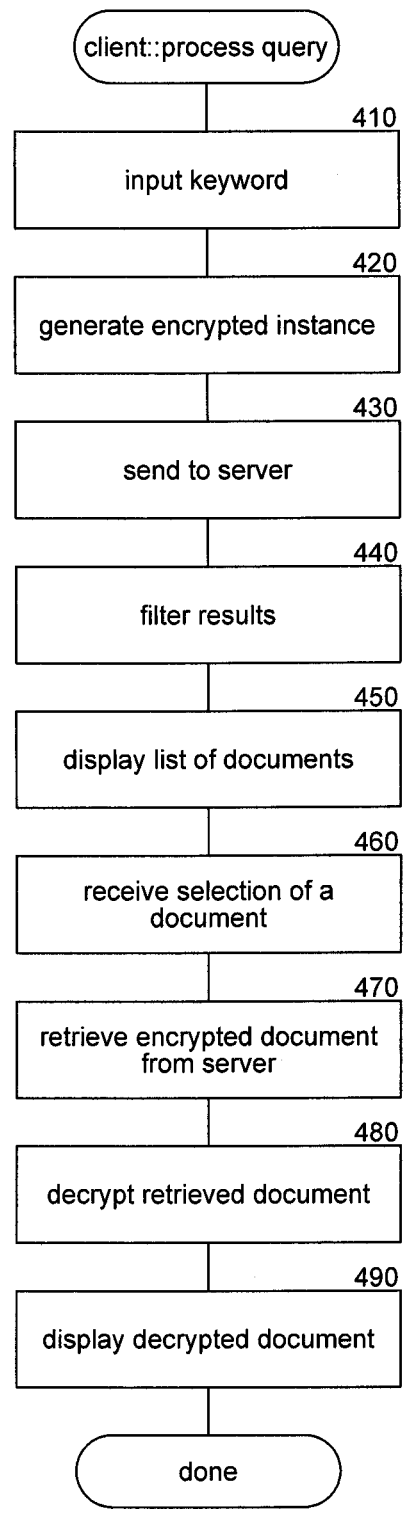
FIG. 4 is a flowchart showing the processing of a process query component of a client subsystem of the encryption system in one embodiment.

FIG. 4 is a flowchart showing the processing of a process query component of a client subsystem of the encryption system in one embodiment. The component receives a user query, retrieves documents from the server computer that match the query, and provides documents to the user. In block 410, the component inputs a keyword received from a user, such as "measles." In block 420, the component encrypts the keyword, for example, by using a cryptographic hash function. In block 430, the component queries the server computer, which returns a list of encrypted document identifiers relevant to the search. For example, when the $f_{max}$ scheme is used, the component may send an encrypted instance of the keyword to the server, resulting in at least $f_{max}$ encrypted document identifiers being returned. As another example, when the extractor graph scheme is used, the component may query the server with an indication of the buckets related to the keyword, causing the server to return the encrypted document identifiers associated with those buckets. In block 440, the component filters the results. For example, the component may use the keyword information embedded in the encrypted document identifiers to determine which of the document identifiers are associated with each keyword in a batch query. Similarly, when the extractor graph scheme is used, the component may discard each retrieved document identifier that is not relevant to the query. As another example, the component may use a count value embedded in the encrypted document identifier to identify redundant document identifiers. For example, if each keyword maps to the same number of document identifiers using the $f_{max}$ scheme described above, the component may use the count value in the encrypted document identifiers to discard duplicate document identifiers from the results. In block 450, the component displays the list of documents corresponding to the filtered list of encrypted document identifiers. In block 460, the component receives a selection of a document from the user. In block 470, the component retrieves an encrypted version of the selected document from the server. In block 480, the component decrypts the retrieved document. In block 490, the component displays the decrypted document and then completes.

Figure 5:
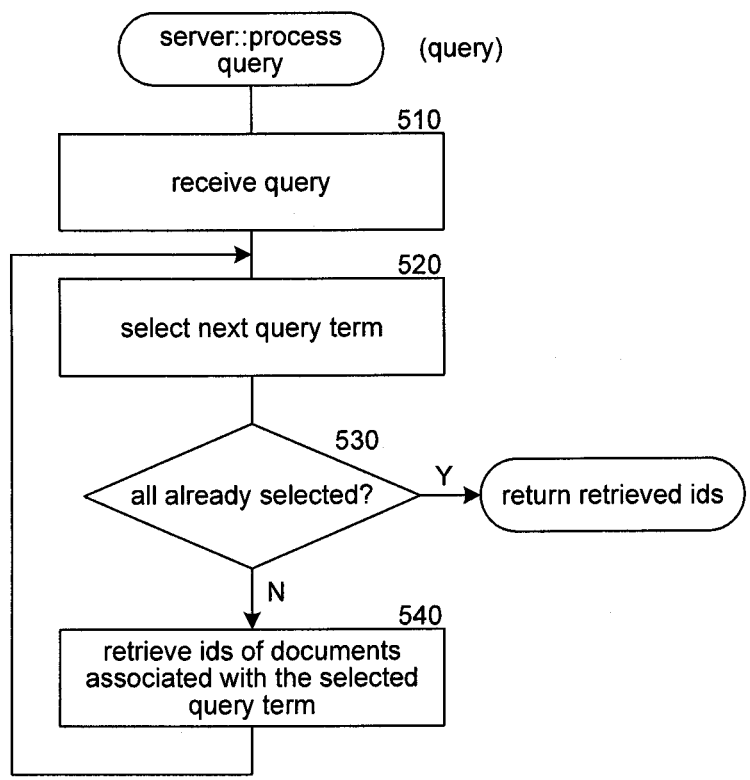
FIG. 5 is a flowchart showing the processing of a process query component of a server computer in one embodiment.

FIG. 5 is a flowchart showing the processing of a process query component of a server computer in one embodiment. The component takes an encrypted query as input, identifies documents matching the query, and returns an indication of the documents. In block 510, the component receives a query. In block 520, the component selects the next term of the query. In decision block 530, if all of the query terms have already been selected, then the component returns the retrieved document identifiers, else the component continues at block 540. In block 540, the component retrieves the document identifiers associated with the selected query term. The component then loops back to block 520 to select the next query term.

Figure 6:
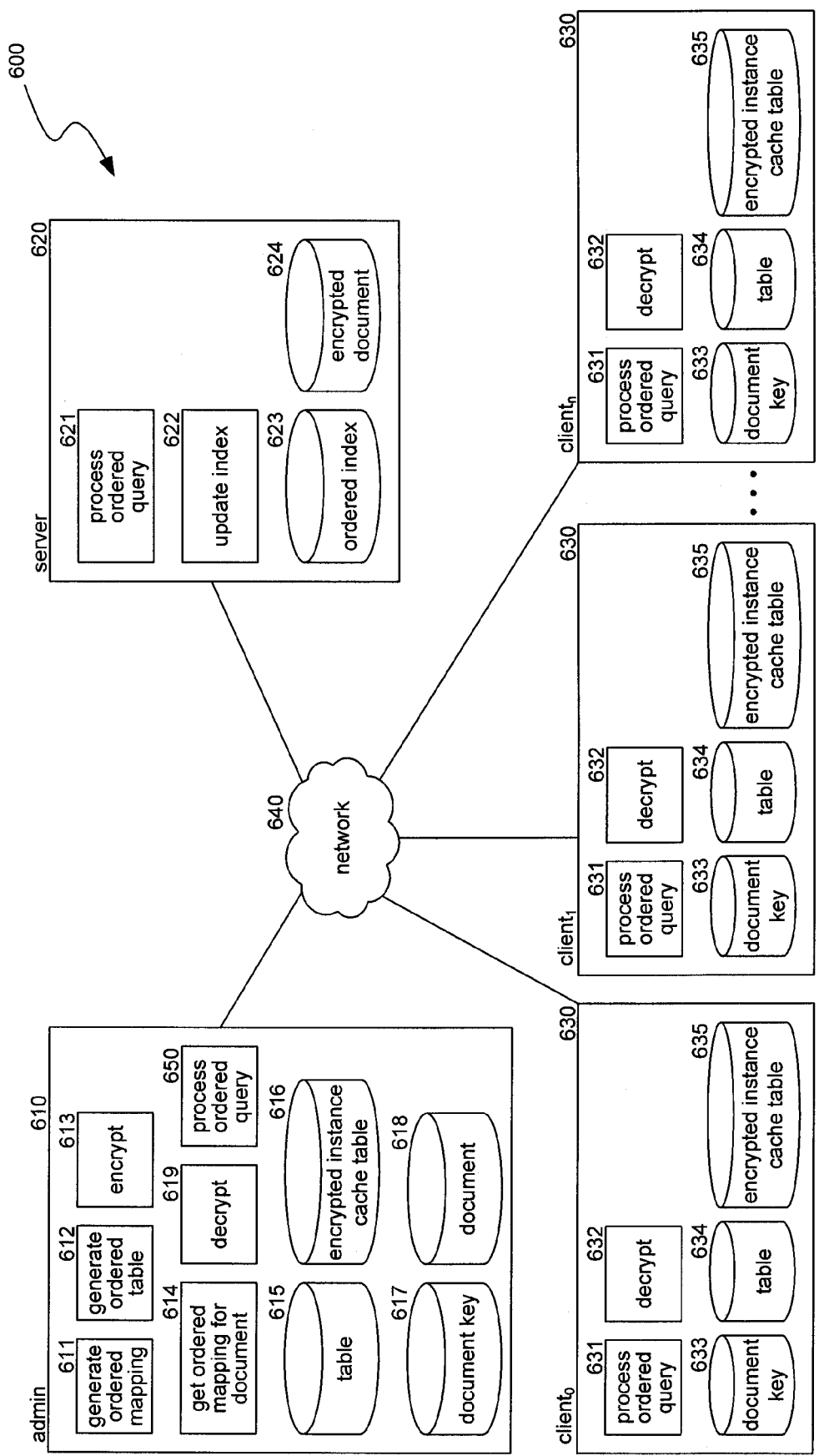
FIG. 6 is a block diagram illustrating various components of the encryption system in one embodiment.

FIG. 6 is a block diagram illustrating various components of the encryption system in one embodiment. Encryption system 600 includes admin computer 610, server computer 620, and a plurality of client computers 630. Each of these computers may be interconnected via network 640. Admin computer 610 is an administrative computer of an entity for which a document index is created, such as a hospital, and includes several components used in the process of encrypting documents and generating an ordered index.

In this embodiment, admin computer 610 includes an admin subsystem of the encryption system 600 that includes generate ordered mapping component 611, generate ordered table component 612, encrypt component 613, decrypt component 619, get ordered mapping for document component 614, table 615, encrypted instance cache table 616, document key store 617, document store 618, and process ordered query component 650. Generate ordered mapping component 611 generates an ordered mapping for a set of documents. Generate ordered table component 612 generates a table of encrypted instances of values. Encrypt component 613 encrypts data according to an encryption algorithm. Decrypt component 619 encrypts data. Get ordered mapping for document component 614 identifies an attribute value of a document and returns an encrypted instance corresponding to the value used to map the document in the ordered index. Table 615 provides associations between a set of ordered values with the encrypted instances of those values. Encrypted instance cache table 616 is a reduced version of table 615 that stores a fraction of the encrypted instances and is used to conserve space if table 615 cannot be stored due to storage limitations and in the process of determining an encrypted instance. Document store 618 stores the documents for which the document index is generated, and document key store 617 stores the keys used for encrypting the documents. Process ordered query component 650 processes document queries received from a user.

In this embodiment, client computers 630 may be accessed by users wishing to perform a query, such as a hospital employee looking for a patient's medical records from the previous 10 years, and may include a client subsystem of the encryption system 600 that includes process ordered query component 631, decrypt component 632, document key store 633, table 634, and encrypted instance cache table 635. Process ordered query component 631 processes document queries received from a user. Decrypt component 632 decrypts encrypted data, such as encrypted documents and encrypted document identifiers, that are retrieved as a result of a query. Document key store 633 stores the keys used for encrypting documents. Table 634 and encrypted instance cache table 635 are copies of table 615 and encrypted instance cache table 616 and provide associations between values and encrypted instances of those values. In some embodiments, a client subsystem may store only one of the tables. For example, if a client computer does not have the resources to store the entire table, the client subsystem may rely on the encrypted instance cache table 635 to determine the encrypted instances of values.

In this embodiment, server computer 620 uses the ordered index to identify documents matching user queries and also provides copies of encrypted documents. Server computer 620 includes process ordered query component 621, update index component 622, ordered index 623, and encrypted document store 624. Process ordered query component 621 processes user queries received from client computers 630. Update index component 622 updates an index using conventional indexing techniques based on associations between encrypted instances and encrypted documents received form the encryption system. Ordered index 623 provides a mapping of encrypted instances of values to indications of documents, such as encrypted document identifiers. Encrypted document store 624 stores encrypted documents.

Figure 7:
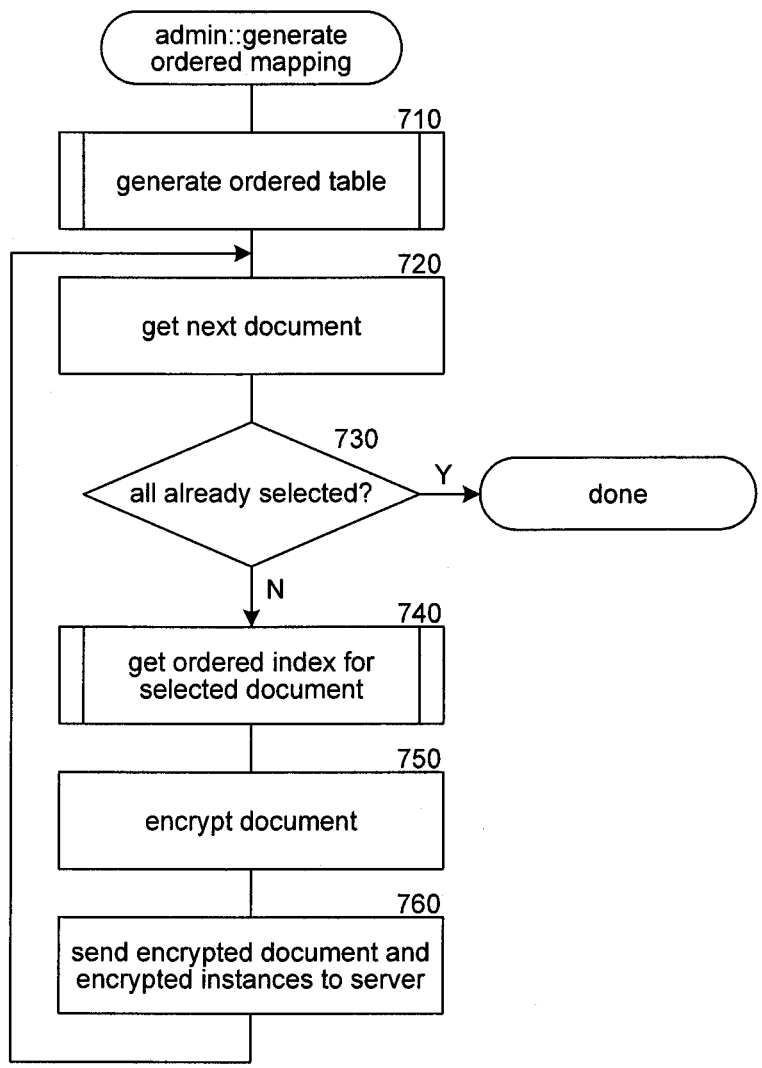
FIG. 7 is a flowchart showing the processing of a generate ordered mapping component of an admin subsystem of the encryption system in one embodiment.

FIG. 7 is a flowchart showing the processing of a generate ordered mapping component of an admin subsystem of the encryption system in one embodiment. The component generates an ordered mapping by generating a table of encrypted instances of values and then associating documents with the encrypted instances. In block 710, the component invokes a generate ordered table component, which generates a table of encrypted instances of attribute values. In block 720, the component gets the next document to be indexed. In decision block 730, if all of the documents have already been selected, then the component completes, else the component continues at block 740. In block 740, the component invokes a get ordered mapping for selected document component, which returns an encrypted instance of an attribute value of the selected document. The component may invoke the get ordered mapping for document component multiple times for each attribute for which there is an ordered index. For example, the component may invoke the component to map the document to an encrypted instance of the document's creation date as well as an encrypted instance of the document's last modification date. In block 750, the component encrypts the document. In block 760, the component sends the encrypted document and the encrypted instance to a server computer, where the encrypted document is stored and where a mapping of the encrypted instance to the indication of the document is added to the index. The component then loops back to block 720 to get the next document.

Figure 8:
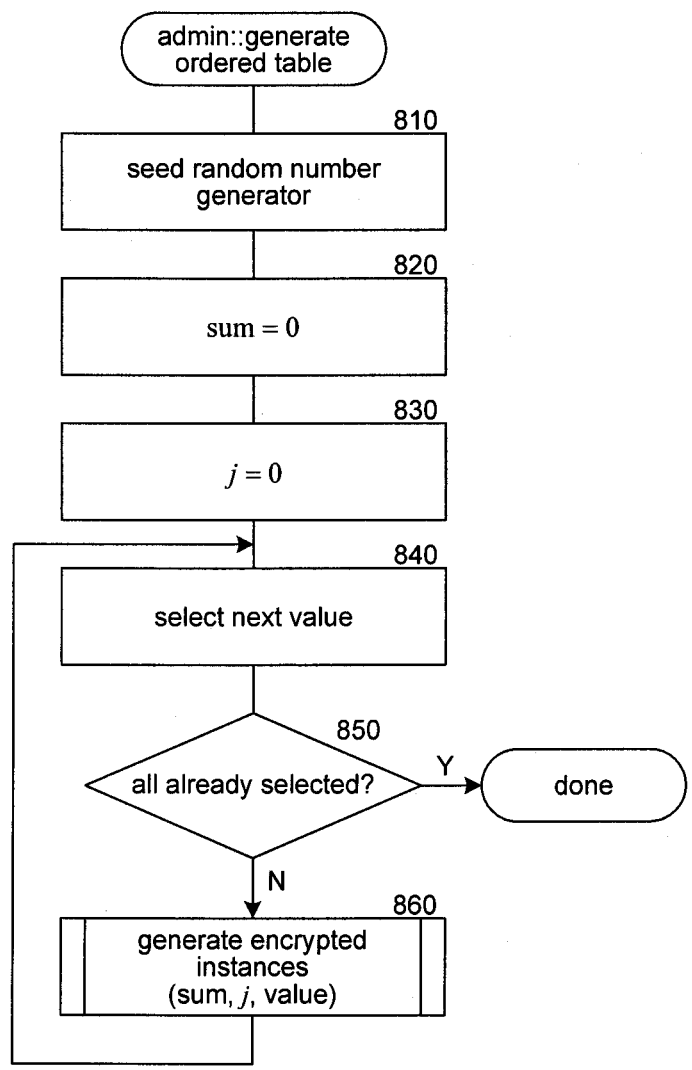
FIG. 8 is a flowchart illustrating the processing of a generate ordered table component of an admin subsystem of the encryption system in one embodiment.

FIG. 8 is a flowchart illustrating the processing of a generate ordered table component of an admin subsystem of the encryption system in one embodiment. The component generates a table of encrypted instances of attribute values. In block 810, the component seeds a random number generator. For example, the component may seed the random number generator with an encryption key unique to the entity for which the ordered table is being generated. In block 820, the component initializes sum to 0. In block 830, the component initializes j, which tracks the start indices in the ordered table for the attribute values, to 0. In block 840, the component selects the next value. In decision block 850, if all of the values have already been selected, then the component completes, else the component continues at block 860. In block 860, the component invokes a generate encrypted instances component that generates a number of encrypted instances for the selected value and stores them in the ordered table. The component then loops back to block 840 to select the next value.

Figure 9:
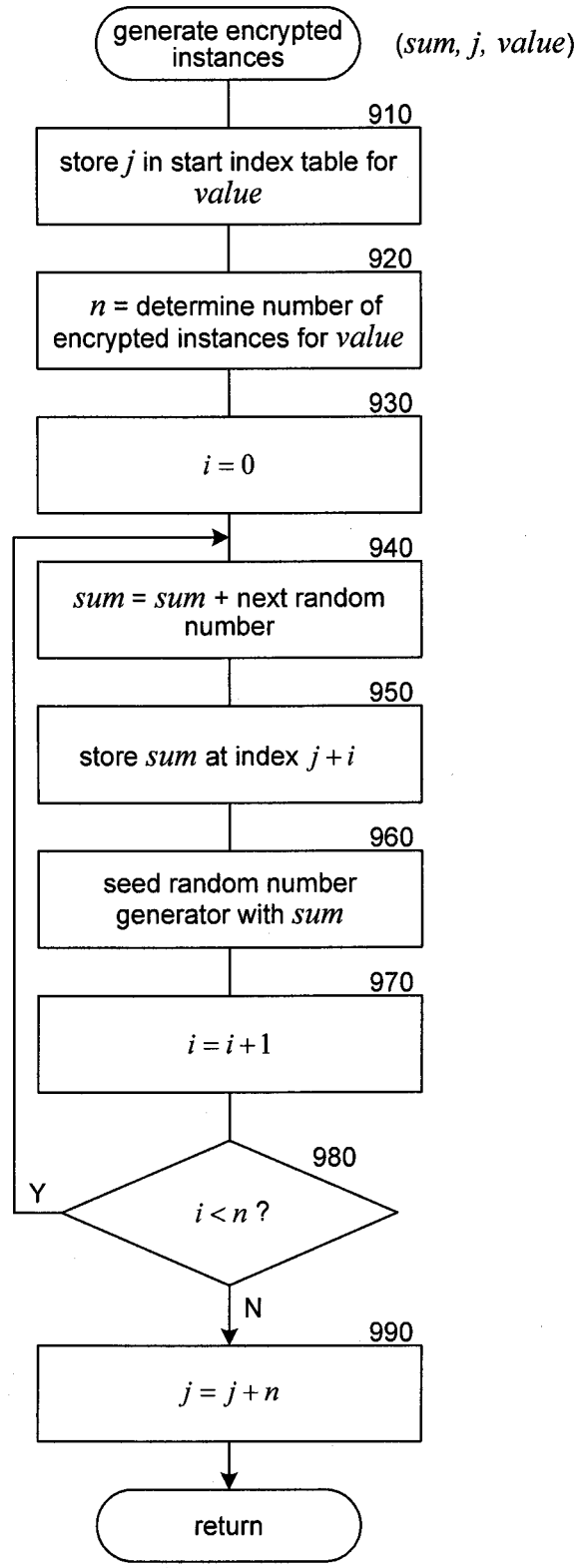
FIG. 9 is a flowchart illustrating the processing of a generate encrypted instances component of an admin subsystem of the encryption system in one embodiment.

FIG. 9 is a flowchart illustrating the processing of a generate encrypted instances component of an admin subsystem of the encryption system in one embodiment. The component receives sum, the most recently generated encrypted instance; value, the value for which the encrypted instances are to be generated; and j, the start index in the ordered table for the passed value. In block 910, the component stores j in a start index table for the passed value. The start index table stores, for each of the attribute values for which the encrypted instances are generated, the first index in the ordered table associated with that value. For example, in an ordered table that maps each day between Jan. 1, 1900 and Dec. 31, 2099 to 10,000 encrypted instances, the start index for Jan. 1, 1900 would be 0 and the start index for Jan. 2, 1900 would be 10,000. In block 920, the component determines n, the number of encrypted instances to generate for the passed value. This number may be the same for each value, as in the example above, or may vary according to the attribute value. For example, the number of encrypted instances to be generated may be determined using a random number generator with the value as a seed. In block 930, the component initializes i, which counts the number of encrypted instances generated for a value, to 0. In block 940, the component sets sum equal to sum plus the next random number generated using the random number generator. In block 950, the component stores sum in the ordered table at index j+i. In some embodiments, the component may randomly select a value between the current value of sum and the previously generated value of sum and store the selected value in the ordered table at index j+i. In block 960, the component reseeds the random number generator with the stored value. Alternatively, the component may reseed the random number generator with a combination of an encryption key associated with the entity for which the admin subsystem and the index where the most recently calculated value of sum was stored (e.g., (encryption key||V+i)). In block 970, the component increases i by 1 to indicate that an encrypted instance has been generated. In decision block 980, if i is less than n, then the component loops back to block 940 to generate the next encrypted instance, else the component continues at block 990. In block 990, the component increases j by n and then returns.

Figure 10:
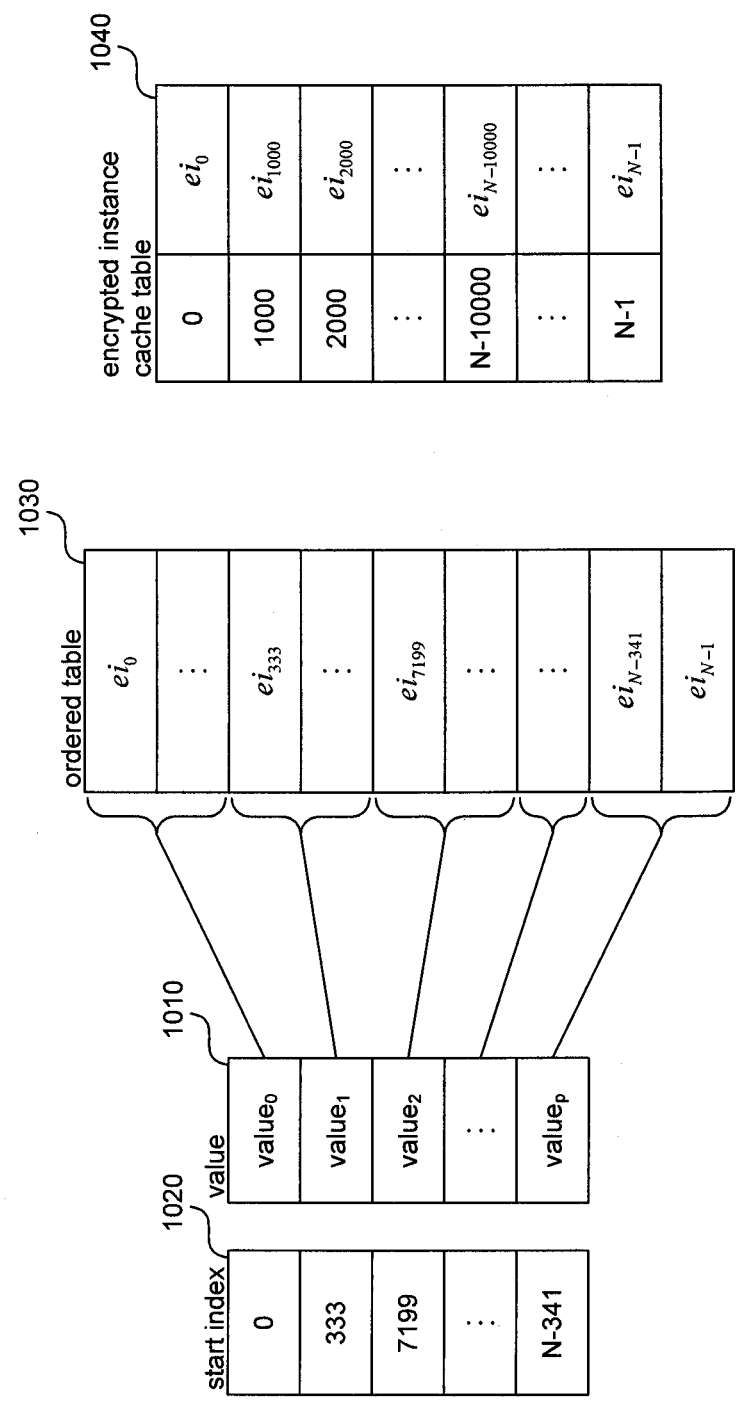
FIG. 10 is a block diagram illustrating data structures of the encryption system in one embodiment.

FIG. 10 is a block diagram illustrating data structures of the encryption system in one embodiment. Value table 1010 stores each of the values for which the encrypted instances stored in the ordered table are generated. Start index table 1020 stores, for each of the values, the index of the first encrypted instance in the ordered table corresponding to the value. In this example, the first encrypted instance in the ordered table associated with $value_0$ is stored at index 0 while the first encrypted instance associated with $value_p$ is stored at index N-341, where p is the number of values and N is the total number of encrypted instances. Ordered table 1030 stores the encrypted instances (ei). Encrypted instance cache table 1040 is a condensed version of ordered table 1030 and contains a subset of the encrypted instances along with the index in the ordered table where each encrypted instance is stored. Encrypted instance cache table 1040 may be used, for example, when the computing system on which it is stored cannot store the entire ordered table. In this example, encrypted instance cache table 1040 stores every thousandth entry in the ordered table. In some examples, the difference between entries in the encrypted instance cache table may be larger or smaller depending on the attributes of the computing system on which the table is stored, such as the amount of available storage or processing capabilities. In other examples, the difference between entries in the encrypted instance cache table may vary. For example, the encrypted instance cache table may store only the first encrypted instance of each value (i.e., the encrypted instance corresponding to the start index associated with a value) where the number of encrypted instances for each value varies. When the ordered table is generated by reseeding a random number generator with the previously generated value each time an encrypted instance is generated, the encrypted instance cache table can be used to generate any missing values in the table. For example, if the encrypted instance stored at index 1034 in the ordered table is required, $ei_{1000}$ can be retrieved from the encrypted instance cache table and used to seed the random number generator. A random number can then be generated and added to $ei_{1000}$ to produce $ei_{1001}$, which is then used to assign the random number generator. This process can be repeated until $ei_{1234}$ is generated. If the encrypted instance cache table were generated using an encryption key and an index value as the seed, this information can be used in conjunction with the encrypted instance cache table to generate the missing values. Although the data structures in FIG. 10 are represented in a manner that is easily comprehensible by a reader, one skilled in the art will recognize that these data structures could be stored in any form. The data structures in FIG. 10 are included only as examples and may not actually be stored in some embodiments. For example, the value table may be unnecessary for certain sequences of values. As another example, the ordered table may not need to be stored on any computer in an encryption system that relies solely on the encrypted instance cache table.

Figure 11:
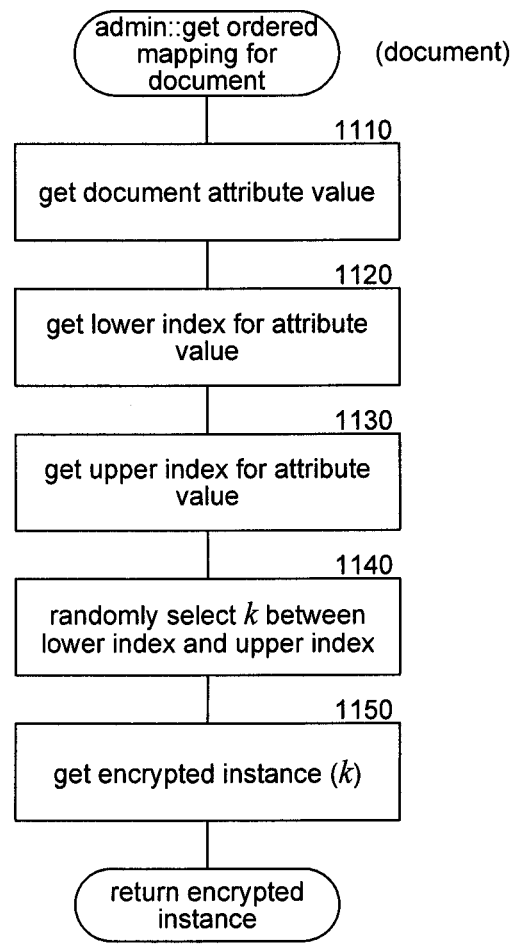
FIG. 11 is a flowchart showing the processing of a get ordered mapping for document component of an admin subsystem of the encryption system in one embodiment.

FIG. 11 is a flowchart showing the processing of a get ordered mapping for document component of an admin subsystem of the encryption system in one embodiment. The component takes a document as input and returns an encrypted instance of an attribute value of the document. In block 1110, the component gets a value of the document for which an encrypted instance is to be generated. For example, if the ordered index is based on dates on which documents were created, the component would get the creation date of the document. In block 1120, the component gets the lower index in the ordered table for the value. As an example, the component may use the start index table to identify the first index in the ordered table corresponding to the value. Using the start index table in FIG. 10 as an example, the lower index for $value_0$ is 0 and the lower index for $value_1$ is 333. In block 1130, the component gets the upper index in the ordered table for the value. As an example, the component may use the start index table to identify the first index in the ordered table corresponding to the attribute value that follows the value for which the upper index is to be generated, and then subtracts 1. Using FIG. 10 as an example, the upper index for $value_0$ is 332 and the upper index for $value_1$ is 7198. In block 1140, the component randomly selects k between the lower index and upper index for the value. In block 1150, the component gets the encrypted instance stored in the ordered table at index k. If the complete ordered table is available, the encrypted instance can be retrieved by accessing the table. If the complete ordered table is not available, the encrypted instance may be generated using an encrypted instance cache table. In some embodiments, the encryption system may manage different ordered tables and/or encrypted instance cache tables for each of a plurality of attributes associated with the documents. For example, one table may contain encrypted instances for document creation dates while another table may contain encrypted instances for last modified dates. The component then returns the encrypted instance and completes.

Figures 12, 13:
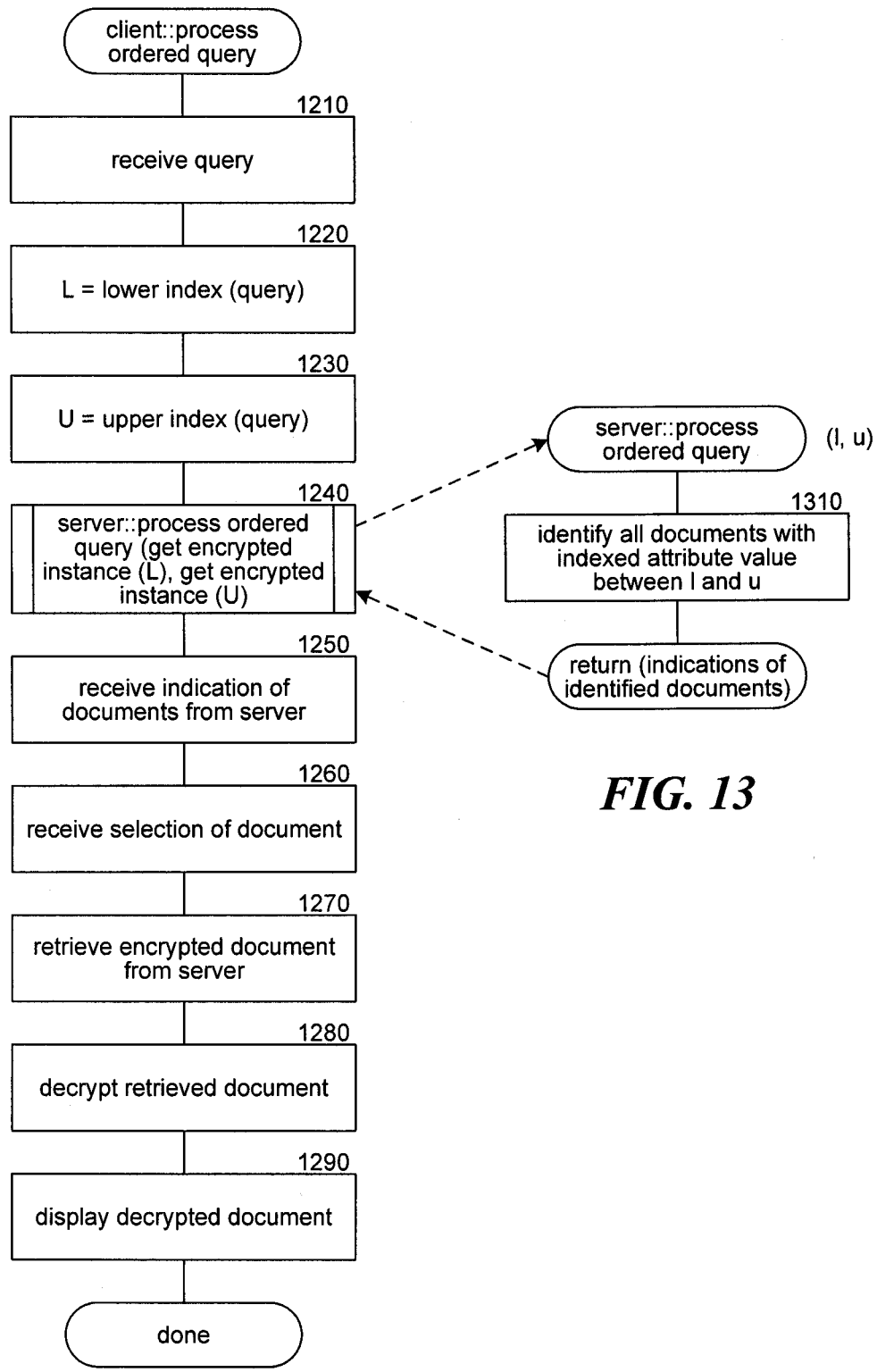
FIG. 12 is a flowchart showing the processing of a process ordered query component of a client subsystem of the encryption system in one embodiment.
FIG. 13 is a flowchart showing the processing of a process ordered query component of a server computer in one embodiment.

FIG. 12 is a flowchart showing the processing of a process ordered query component of a client subsystem of the encryption system in one embodiment. The component receives a user query, retrieves documents from the server computer that match the query, and provides documents to the user. In block 1210, the component receives a query. For example, a user may search for all documents created between Jan. 1, 2008 and Dec. 31, 2008. As another example, a user may search for all documents that are larger than or equal to 5 MB. In block 1220, the component determines an index for the lowest encrypted instance associated with the query. Because the query may contain multiple values (e.g., Jan. 1, 2008 and Dec. 31, 2008), the component may first determine the smallest value relevant to the query. For example, a query for all documents created after Jan. 1, 2008 would have a smallest relevant value of Jan. 2, 2008. Once the smallest value relevant to the query is determined, the component can retrieve the start index for that value, which corresponds to the lower index for the query. The smallest value for some open-ended queries may be undefined, such as a query for all documents created before Jul. 1, 2008. For these queries, the component may use the lowest index in the ordered table as the lower index for the query. In block 1230, the component determines an index for the highest encrypted instance associated with the query. Because the query may contain multiple values (e.g., Jan. 1, 2008 and Dec. 31, 2008), the component may first determine the largest value relevant to the query. For example, a query for all documents created before Jan. 1, 2008 would have a largest relevant value of Dec. 31, 2008. Using the largest value relevant to the query, the component can retrieve the start index for the next largest value and can then subtract 1, which corresponds to the upper index for the query. The largest value for some open-ended queries may be undefined, such as a query for all documents created on or after Jul. 1, 2008. For these queries, the component may use the highest index in the ordered table as the upper index for the query. In some cases, the smallest and largest values relevant to a query may be the same, for example, in a search for all documents created on Jan. 1, 2008. In this case, the lower index for the query is equivalent to the lowest index in the ordered table associated with Jan. 1, 2008, and the upper index for the query is equivalent to the highest index in the ordered table associated with Jan. 1, 2008. In block 1240, the component invokes a process ordered query component of a server computer by passing to a server computer the encrypted instances corresponding to the lower and upper indexes. The component may retrieve the encrypted instances directly from the ordered table or may generate the encrypted instances using an encrypted instance cache table, which may contain only the first encrypted instance for each value. In some embodiments, open-ended queries may be performed by sending to the server computer a single index and a relational operator (e.g., >, <, ≥, ≤), rather than determining an index for an undefined value. In block 1250, the component receives from the server computer an indication of the documents that correspond to the query. In block 1260, the component receives a selection of a document from a user. In block 1270, the component retrieves an encrypted document from the server corresponding to the selected document. In block 1280, the component decrypts the encrypted document. In block 1290, the component displays the decrypted document and then completes.

FIG. 13 is a flowchart showing the processing of a process ordered query component of a server computer in one embodiment. The component takes a pair of encrypted instances as inputs and returns an indication of a set of documents. In block 1310, the component uses the ordered index to identify all documents that map to the encrypted instances of the received values. The component then returns an indication of the identified documents and completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a networked computer system for searching for encrypted documents, the method comprising:
for each of a plurality of values of an attribute of documents, the values having an ordering,
determining a number of different encrypted instances of the value to generate, wherein the number of different encrypted instances determined for at least one of the plurality of values is greater than one,
generating the determined number of different encrypted instances of the value so that the value serves as a basis for generating each of the determined number of different encrypted instances of the value, wherein more than one encrypted instance of the at least one of the plurality of values is generated, and
storing the generated encrypted instances of the value, wherein each encrypted instance of the value can be decrypted into the value;
generating a mapping of the values of the attribute to each document having that value for the attribute, wherein the mapping maps different encrypted instances of a value to different documents;
providing the generated mapping to a document storage service; and
identifying an encrypted document that matches a query that specified a value for the attribute by,
determining a lower bound on encrypted instances associated with the value specified by the query,
determining an upper bound on encrypted instances associated with the value specified by the query,
sending the determined lower and upper bounds to a document storage service, and
receiving from the document storage service an indication of at least one document associated with an encrypted instance between the lower and upper bounds.

2. The method of claim 1 wherein the number of encrypted instances generated for each value is the same.

3. The method of claim 1 wherein determining a number of encrypted instances to generate for a value includes invoking a random number generator.

4. The method of claim 1 wherein the encrypted instances are stored in a first table and wherein a second table stores, for each value in a sequence, the index from the first table of the smallest encrypted instance of that value.

5. The method of claim 1, further comprising:
storing a proper subset of the generated encrypted instances in an encrypted instance cache table.

6. The method of claim 1 wherein the indication of the at least one document is a document identifier.

7. The method of claim 1, further comprising:
generating a searchable document index at least in part by:
for each of the plurality of documents,
identifying a value associated with the document,
randomly selecting one of the encrypted instances corresponding to the identified value, and storing a mapping between the document and only the randomly selected encrypted instance without storing a mapping between the document and the other encrypted instances.

8. The method of claim 1 wherein the query specifies multiple values and wherein a first value specified by the query is different from a second value specified by the query, wherein identifying the encrypted document that matches the query that specified the multiple values further comprises:
for each of the multiple values specified by the query,
determining a lower bound on encrypted instances associated with the value specified by the query, and
determining an upper bound on encrypted instances associated with the value specified by the query.

9. The method of claim 1 wherein at least one encrypted instance of a first value is generated by adding a randomly generated number to a previously generated encrypted instance of the first value, so that the first value serves as a basis for generating the at least one encrypted instance of the first value, and so that the first value serves as a basis for generating the previously generated encrypted instance of the first value.

10. The method of claim 9, further comprising:
using a random number generator seeded with the previously generated encrypted instance to generate the at least one encrypted instance of the first value.

11. The method of claim 1, further comprising:
storing a proper subset of the generated encrypted instances in an encrypted instance cache table.

12. The method of claim 11, wherein selecting at least one of the encrypted instances includes generating at least one encrypted instance based on an encrypted instance stored in the encrypted instance cache table.

13. The method of claim 1, wherein at least one of the encrypted instances is generated based on an encrypted instance stored in the encrypted instance cache table.

14. A computer-readable storage medium containing instructions for generating a document index by operations comprising:
for each of a plurality of values of an attribute of documents, the values having an ordering,
determining a number of different encrypted instances to generate for the value, and
generating the determined number of different encrypted instances of the value so that the value serves as a basis for generating each of the determined number of different encrypted instances of the value, wherein the number of encrypted instances of at least one of the values is greater than one, wherein each encrypted instance is unique, and wherein each of the generated encrypted instances of the value decrypts to the value,
storing the generated encrypted instances of the value; and
generating a mapping of the values of the attribute to each document having that value for the attribute, wherein the mapping maps different encrypted instances of a value to different documents;
providing the generated mapping to a document storage service; and
identifying an encrypted document that matches a query that specified a value for the attribute by,
determining a lower bound on encrypted instances associated with the value specified by the query,
determining an upper bound on encrypted instances associated with the value specified by the query,
sending the determined lower and upper bounds to a document storage service, and
receiving from the document storage service an indication of at least one document associated with an encrypted instance between the lower and upper bounds.

15. The computer-readable storage medium of claim 14 wherein at least one encrypted instance of a first value is generated by adding a randomly generated number to a previously generated encrypted instance of the first value, wherein the first value serves as a basis for generating the at least one encrypted instance of the first value and wherein the first value serves as a basis for generating the previously generated encrypted instance of the first value.

16. The computer-readable storage medium of claim 15, the operations further comprising:
using a random number generator seeded with the previously generated encrypted instance to generate the randomly generated number.

17. The computer-readable storage medium of claim 14, the operations further comprising:
storing a proper subset of the generated encrypted instances in an encrypted instance cache table.

18. The computer-readable storage medium of claim 17 wherein at least one of the encrypted instances is generated based on an encrypted instance stored in the encrypted instance cache table.

19. The computer-readable storage medium of claim 14, wherein generating the determined number of different encrypted instances of a first value of the set of ordered values comprises:
generating a first encrypted instance of the first value by encrypting the first value;
generating a second encrypted instance of the first value by adding a randomly-generated value to the first encrypted instance of the first value;
generating a third encrypted instance of the first value by adding a randomly-generated value to the second encrypted instance of the first value; and
generating a fourth encrypted instance of the first value by adding a randomly-generated value to the third encrypted instance of the first value,
so that the first value is associated with at least four different encrypted instances of the first value and each encrypted instances is associated with exactly one value of the set of ordered values.

20. The computer-readable storage medium of claim 14, the operations further comprising:
generating a searchable document index at least in part by:
for each of the plurality of documents,
identifying a value associated with the document,
randomly selecting one of the encrypted instances corresponding to the identified value, and
storing a mapping between the document and only the randomly selected encrypted instance without storing a mapping between the document and the other encrypted instances.

21. A system having a memory and a processor, the system comprising:
a component configured to, for each of a plurality of values of an attribute of documents, the values having an ordering:
determine a number of different encrypted instances of the value to generate, wherein the number of different encrypted instances determined for at least one of the plurality of values is greater than one, generate the determined number of different encrypted instances of the value so that the value serves as a basis for generating each of the determined number of different encrypted instances of the value, wherein more than one encrypted instance of the at least one of the plurality of values is generated, and store the generated encrypted instances of the value, wherein each encrypted instance of the value can be decrypted into the value;

a component configured to generate a mapping of the values of the attribute to each document having that value for the attribute, wherein the mapping maps different encrypted instances of a value to different documents;

a component configured to provide the generated mapping to a document storage service; and a component configured to identify an encrypted document that matches a query that specified a value for the attribute, wherein the component configured to identify the encrypted document that matches a query that specified a value for the attribute is further configured to:

determine a lower bound on encrypted instances associated with the value specified by the query, determine an upper bound on encrypted instances associated with the value specified by the query, send the determined lower and upper bounds to a document storage service, and receive from the document storage service an indication of at least one document associated with an encrypted instance between the lower and upper bounds wherein each of the components comprises computer-executable instructions stored in the memory for execution by the system.

22. The system of claim 21 wherein the number of encrypted instances generated for each value is the same.

23. The system of claim 21 wherein the component configured to determine the number of encrypted instances to generate for a value includes a component configured to invoke a random number generator.

24. The system of claim 21 wherein the encrypted instances are stored in a first table and wherein a second table stores, for each value in the sequence, the index from the first table of the smallest encrypted instance of that value.

25. The system of claim 21, further comprising:
storing a proper subset of the generated encrypted instances in an encrypted instance cache table.

26. The system of claim 21, wherein the indication of the at least one document is a document identifier.

27. The system of claim 21, further comprising:
a component configured to generate a searchable document index at least in part by:
for each of the plurality of documents,
identifying a value associated with the document,
randomly selecting one of the encrypted instances corresponding to the identified value, and
storing a mapping between the document and only the randomly selected encrypted instance without storing a mapping between the document and the other encrypted instances.

\* \* \* \* \*